(12) United States Patent
Benz et al.

(10) Patent No.: US 7,574,855 B2
(45) Date of Patent: Aug. 18, 2009

(54) METHOD FOR OPERATING A GAS TURBINE AND A GAS TURBINE FOR IMPLEMENTING THE METHOD

(75) Inventors: Eribert Benz, Birmenstorf (CH); Peter Flohr, Turgi (CH); Jaan Hellat, Baden-Ruetihof (CH); Graham Webb, Weiningen (CH)

(73) Assignee: ALSTOM Technology Ltd., Baden (CH)

( * ) Notice: Subject to any disclaimer, the term of this patent is extended or adjusted under 35 U.S.C. 154(b) by 530 days.

(21) Appl. No.: 11/275,477

(22) Filed: Jan. 9, 2006

(65) Prior Publication Data

US 2007/0033942 A1     Feb. 15, 2007

Related U.S. Application Data

(60) Provisional application No. 60/706,778, filed on Aug. 10, 2005.

(51) Int. Cl.
*F02C 1/06* (2006.01)
(52) U.S. Cl. .................. 60/39.17; 60/39.12; 60/781
(58) Field of Classification Search .............. 60/781, 60/774, 39.12, 39.17
See application file for complete search history.

(56) References Cited

U.S. PATENT DOCUMENTS

| | | | |
|---|---|---|---|
| 1,589,704 A * | 6/1926 | Kenworthy | ............ 239/430 |
| 4,261,167 A | 4/1981 | Paull et al. | |
| 4,488,398 A | 12/1984 | Noguchi | |
| 4,785,621 A | 11/1988 | Alderson et al. | |
| 4,785,622 A | 11/1988 | Plumley et al. | |

(Continued)

FOREIGN PATENT DOCUMENTS

| | | |
|---|---|---|
| DE | 947843 | 8/1956 |
| DE | 2503193 | 7/1976 |
| EP | 0622535 | 11/1994 |
| EP | 0634562 | 1/1995 |
| EP | 0795685 | 2/1997 |

(Continued)

OTHER PUBLICATIONS

Mukherjee, D., "State-of-the-art gas turbines—a brief update," ABB Review 1997:4-14;vol. 2, ABB Asea Brown Boveri Ltd., Zurich, Switzerland.

(Continued)

*Primary Examiner*—Michael Cuff
*Assistant Examiner*—Phutthiwat Wongwian
(74) *Attorney, Agent, or Firm*—Cermak Kenealy; Vaidya & Nakajima LLP; Adam J. Cermak (57) ABSTRACT

In a method for operating a gas turbine (11) in a combined cycle power plant (40), air is drawn in and compressed though the gas turbine (11), the compressed air is led to a combustor (18, 19) to burn a syngas recovered from a fossil fuel, especially coal, and the gases that result in the course of the combustion are expanded in a downstream turbine (16, 17). In such a method, an improved degree of efficiency is achieved by virtue of the fact that a gas turbine (11) with reheating is used, which includes two combustors (18, 19) and two turbines (16, 17); in the first combustor (18), syngas is burned with the compressed air, and the resultant hot gases, e.g., flue gases, are expanded in the first turbine (16), and in the second combustor syngas is burned by the gases coming from the first turbine (16), and the resultant hot gases are expanded in the second turbine (17).

8 Claims, 5 Drawing Sheets

U.S. PATENT DOCUMENTS

| | | | |
|---|---|---|---|
| 4,896,499 A | | 1/1990 | Rice |
| 4,986,499 A | * | 1/1991 | Ponticelli .................. 248/27.1 |
| 5,081,845 A | | 1/1992 | Allam et al. |
| 5,459,994 A | | 10/1995 | Drnevich |
| 5,577,378 A | | 11/1996 | Althaus et al. |
| 6,116,016 A | | 9/2000 | Wada et al. |
| 6,487,863 B1 | | 12/2002 | Chen et al. |
| 6,513,317 B2 | | 2/2003 | Arar et al. |
| 2002/0077512 A1 | * | 6/2002 | Tendick et al. ............. 568/959 |
| 2002/0148213 A1 | | 10/2002 | Yu |
| 2004/0168468 A1 | | 9/2004 | Peyron |
| 2007/0033918 A1 | | 2/2007 | Benz et al. |
| 2007/0033943 A1 | | 2/2007 | Benz et al. |
| 2007/0039468 A1 | | 2/2007 | Benz et al. |

FOREIGN PATENT DOCUMENTS

| | | |
|---|---|---|
| EP | 0773416 | 5/1997 |
| EP | 1098077 | 5/2001 |
| GB | 2335953 | 10/1999 |
| JP | 08218891 | 8/1996 |
| JP | 11030131 | 2/1999 |

OTHER PUBLICATIONS

Search Report for Swiss Patent App. No. CH 20202005 (Apr. 5, 2005).

International Search Report for PCT Patent App. No. PCT/EP2006/064790 (Nov. 23, 2006).

Pending Claims from U.S. Appl. No. 11/275,478 as of Oct. 30, 2008, pp. 1-3.

Pending Claims from U.S. Appl. No. 11/275,479 as of Oct. 30, 2008, pp. 1-4.

Pending Claims from U.S. Appl. No. 11/275,480 as of Oct. 30, 2008, pp. 1-3.

Non-Final Office Action issued in U.S. Appl. No. 11/275,478 (Oct. 17, 2008).

Non-Final Office Action issued in U.S. Appl. No. 11/275,479 (Oct. 17, 2008).

Non-Final Office Action issued in U.S. Appl. No. 11/275,480 (May 13, 2008).

* cited by examiner

|  | H2, CO | N2 |
|---|---|---|
| m1 | 40-60 | 0-20 |
| m2 | 60-40 | 100-80 |

METHOD FOR OPERATING A GAS TURBINE AND A GAS TURBINE FOR IMPLEMENTING THE METHOD

This application claims priority under 35 U.S.C. § 119 to U.S. provisional application No. 60/706,778, filed 10 Aug. 2005, the entirety of which is incorporated by reference herein.

BACKGROUND OF THE INVENTION

1. Field of the Invention

The present invention refers to the field of power plant technology. It relates to a method for operating a (stationary) gas turbine, as well as to a gas turbine for implementing the method.

2. Brief Description of the Related Art

A gas turbine with reheating (reheat gas turbine) is known (see, for example, U.S. Pat. No. 5,577,378 or "State of the art gas turbines—a brief update," ABB Review February, 1997, FIG. 15, turbine type GT26), which combines flexible operation with very low flue gas emission readings.

Figure 1:
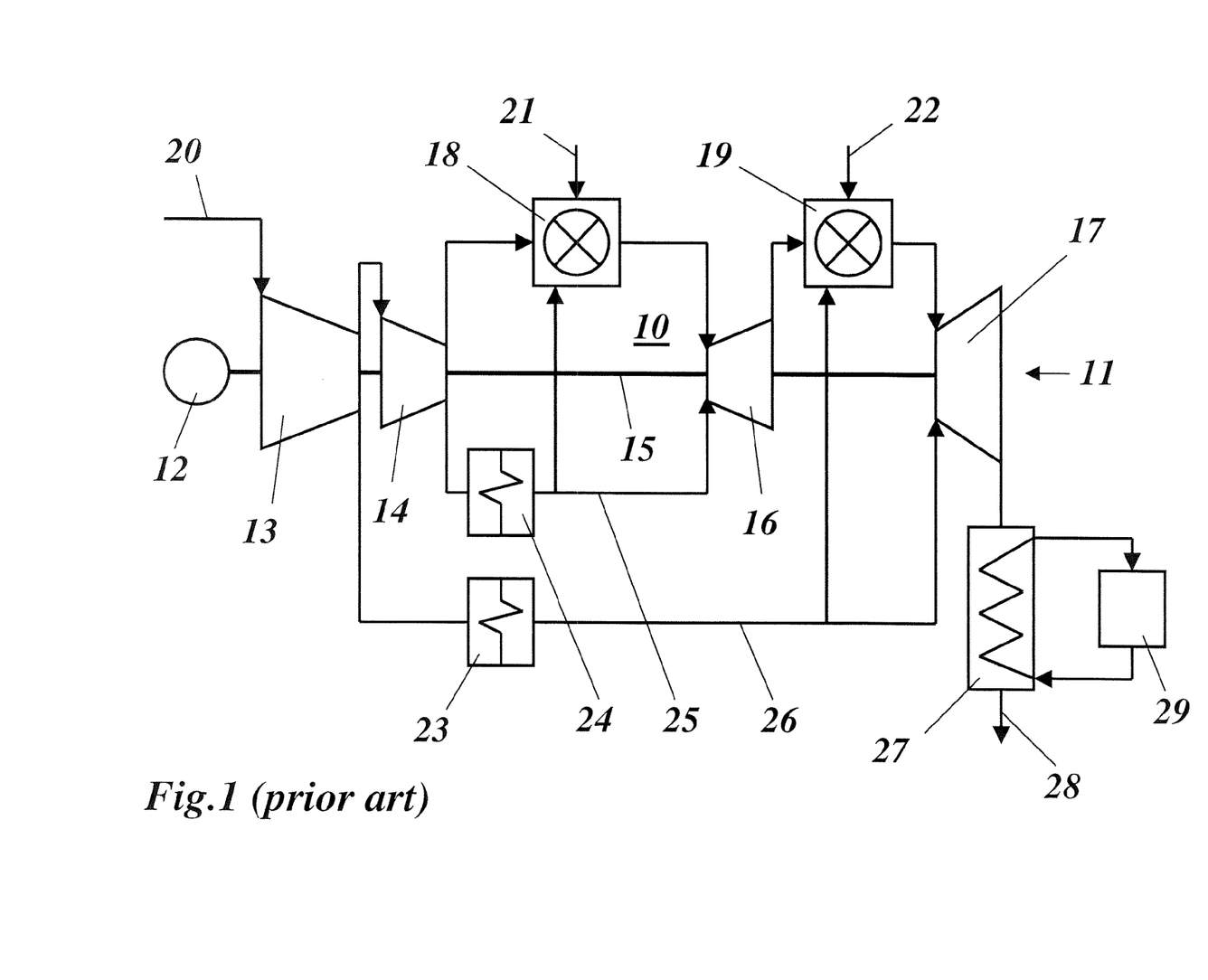
FIG. 1 shows the simplified schematic of a combined cycle power plant with a gas turbine with reheating or sequential combustion according to the prior art.

The principle of the known gas turbine with reheating is shown in FIG. 1. The gas turbine 11, which is a portion of a combined cycle power plant 10, includes two connected compressors, arranged behind one another on a common shaft 15, namely a low pressure compressor 13 and a high pressure compressor 14, as well as two combustors, namely a high pressure combustor 18 and a reheat combustor 19, and the pertinent turbines, namely a high pressure turbine 16 and a low pressure turbine 17. The shaft 15 drives a generator 12.

The manner in which the unit works is as follows: air is drawn in via an air inlet 20 from the low pressure compressor 13, and is compressed initially to a level of intermediate pressure (ca. 20 bar). The high pressure compressor 14 then further compresses the air to a level of high pressure (ca. 32 bar). Cooling air is diverted at both the level of intermediate pressure and at the level of high pressure and cooled down in pertinent OTC coolers (OTC=Once Through Cooler) 23 and 24 and conducted further to the combustors 18 and 19 and turbines 16, 17 via cooling lines 25 and 26 for cooling purposes. The remaining air from the high pressure compressor 14 is led to the high pressure combustor 18 and heated there by the combustion of a fuel, which is introduced via the fuel feedline 21. The resultant flue gas is then expanded in the subsequent high pressure turbine 16 to an intermediate level of pressure, as it performs work. After expansion, the flue gas is heated again in the reheat combustor 19 by means of the combustion of a fuel introduced via fuel feedline 22 before it is expanded in the subsequent low pressure turbine 17, performing additional work in the process.

The cooling air, which flows through the cooling lines 25, 26, is blown in at suitable points of combustors 18, 19 and turbines 16, 17, in order to limit the material temperatures to a reasonable extent. The flue gas that comes from the low pressure turbine 17 is sent through a heat recovery steam generator (HRSG) 27, in order to produce steam, which flows through a steam turbine 29 within a water-steam circuit, performing additional work there. After flowing through the heat recovery steam generator 27, the flue gas is finally released to the outside through a flue gas line 28. The OTC coolers 23, 24 are part of the water-steam circuit; super-heated steam is produced at their outlets.

As a result of the two combustions in combustors 18, 19, which are dependent upon one another and follow one another sequentially, a great flexibility in operation is achieved; the combustion temperatures can be adjusted so that the maximum degree of effectiveness is achieved within the existing limits. The sequential combustion system's low flue gas values are the result of the inherently low emission values that can be achieved in conjunction with reheating.

On the other hand, combined cycle power plants with single-stage combustion in the gas turbines are known (see, for example, U.S. patent application Ser. Nos. US-A -4,785, 622 or US-B2-6,513,317), in which a coal gasifier is integrated, in order to provide the requisite fuel for the gas turbine in the form of syngas, which is recovered from coal. Such combined cycle power plants are referred to as IGCC plants (IGCC=Integrated Gasification Combined Cycle).

The present invention now proceeds from the recognition that by using gas turbines with reheating in an IGCC unit, the advantages of this type of gas turbine can be rendered usable for the unit in a particular manner.

SUMMARY OF THE INVENTION

It is a task of the invention to indicate a method for the operation of a gas turbine that works together with a gasification unit for fossil fuels, especially coal, which is distinguished by an improved degree of efficiency, which can also be realized to particularly good effect using available components, as well to create a gas turbine for implementing the method.

It is particularly advantageous that in a gas turbine unit that works with syngas, a gas turbine with reheating that includes two combustors and two turbines be used, such that in the first combustor, syngas is burned using compressed air and the resultant hot gases are expanded in the first turbine, and such that in the second combustor, syngas is burned employing the flue gases coming from the first turbine and the resultant hot gases are expanded in the second turbine.

An embodiment of the method according to the invention is characterized in that at least a portion of the nitrogen that occurs in conjunction with the separation of the air is used to dilute the syngas burned in the second combustor, such that, in particular, 80-100% of the nitrogen that occurs in the separation of the air is used to dilute the syngas that is burned in the second combustor.

The nitrogen that occurs in conjunction with the separation of the air is preferably blown directly into the second combustor, i.e., without further compression.

The remainder of the nitrogen that occurs in conjunction with the separation of the air is preferably used to dilute the syngas burned in the first combustor, such that, in particular, the nitrogen provided for the first combustor is first compressed to a higher pressure prior to being blown into the combustor.

According to another embodiment of the invention, a portion of the syngas produced in the gasification unit is blown into the second combustor without further compression.

A further embodiment is characterized in that a portion of the syngas produced in the gasification unit is first compressed to a higher pressure in a compressor and then blown into the first combustor.

Preferably, the syngas and the nitrogen that is provided for dilution are blown into the combustors in concentric arrangement, such that the nitrogen jet surrounds the syngas jet in the manner of a mantle, and the spraying occurs perpendicular to the direction of the compressed air that flows into the combustors or the outgoing air from the first turbine, respectively.

An embodiment of the gas turbine according to the invention is characterized in that a compressor for the purpose of compressing the nitrogen is provided in the nitrogen line between the outlet of the air separation unit and the first combustor.

According to another embodiment, a compressor for the purpose of compressing the syngas is provided in the syngas feed line, between the outlet of the unit that produces the syngas and the first combustor.

In the process, preferably, fuel nozzles are preferred in the first and/or second combustor, through which internally, in concentric arrangement, the syngas, and externally, in the form of a surrounding mantle, the nitrogen, flows into the combustor, oblique to the direction of flow of the compressed air or outgoing air from the first turbine.

BRIEF DESCRIPTION OF THE DRAWINGS

In what follows, the invention is to be explained in greater detail by virtue of the embodiment examples in conjunction with the drawings.

DETAILED DESCRIPTION OF EXEMPLARY EMBODIMENTS

Figure 2:
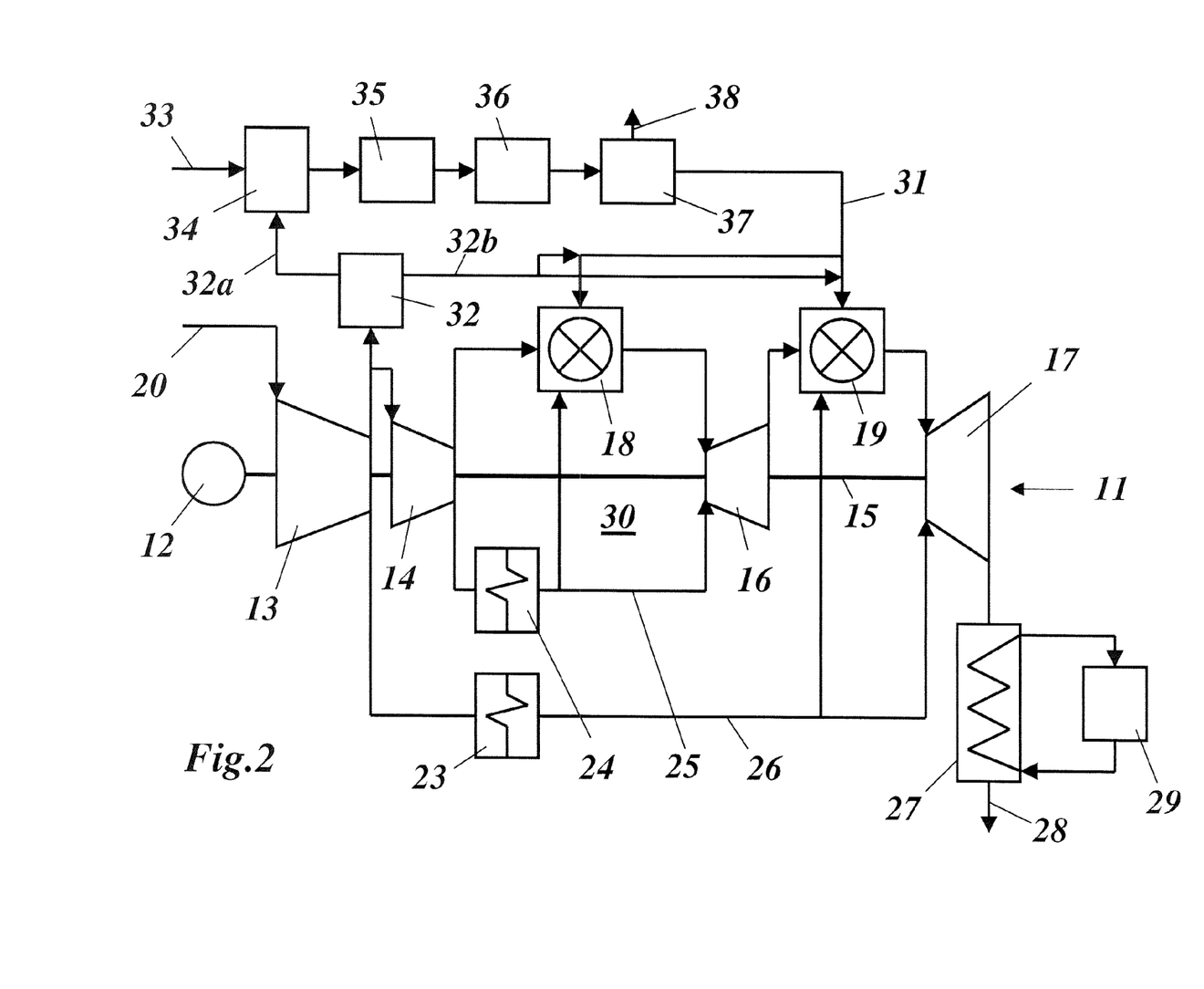
FIG. 2 shows the simplified schematic of an IGCC unit with a gas turbine with reheating or sequential combustion, as it lends itself to the realization of the invention.

In FIG. 2, in a markedly simplified schematic, an IGCC unit with a gas turbine with re-heating, or sequential combustion, respectively, is shown, as it can be embodied in exemplary fashion within the context of the invention. The combined cycle power plant 30 includes a gas turbine 11 with a low pressure compressor 13, a downstream high pressure compressor 14, a high pressure combustor 18 with a downstream high pressure combustor 18 with a downstream high pressure turbine 16 and a re-heating combustor 19 with a downstream low pressure turbine 17. The compressors 13, 14 and the turbines 16, 17 sit on a commonly shared shaft 15, by which a generator 12 is driven. The combustors 18, 19 are supplied with syngas ($H_2$, CO) as fuel via a syngas feed line 31, which is produced by gasifying coal (coal feeding 33) in a coal gasifier 34 (other fossil fuels can be gasified as well). A cooling device 35 for the syngas, a filtering device 36, and a $CO_2$ separator 37 with a $CO_2$ outlet 38 to release the $CO_2$ that is given off to the coal gasifier 34, are included.

Oxygen ($O_2$), which is recovered in an air separation unit 32, and is added via an oxygen line 32a, is used to gasify coal in the coal gasifier 34. The air separation unit 32 receives compressed air from the outlet of the low pressure compressor 13. The nitrogen ($N_2$), which also occurs in the separation, is led via a nitrogen line 32b to various parts of the high pressure combustor 18 and the low pressure combustor 19 (see also the diagram in FIG. 6).

For cooling the components of the combustors 18, 19 and turbines 16, 17, which are exposed to the hot gas, compressed cooling air is drawn off at the outlets of both compressors 13 and 14, cooled off in a topped OTC cooler 23 or 24, respectively, and then led via corresponding cooling lines 25 and 26 to those points that are to be cooled.

At the outlet of the low pressure turbine 17, a heat recovery steam generator 27 is provided, which, together with a connected steam turbine 29, is part of a water-steam cycle. The flue gas that escapes from the heat recovery steam generator 27 is released to the outside by way of a flue gas line 28.

The main technical challenges associated with the combustion of syngas in the combustor of a gas turbine are:

minimizing gas pressure requirements above the gas pressures that are present in the gasification and separation of the air, the achievement of low emission levels, sufficient distance from the limits of flashbacks and pulsations, and maintaining operational flexibility in the event of changes in the quality of the coal gas as well as the possibility of support with other fuels (natural gas or oil).

Figure 3:
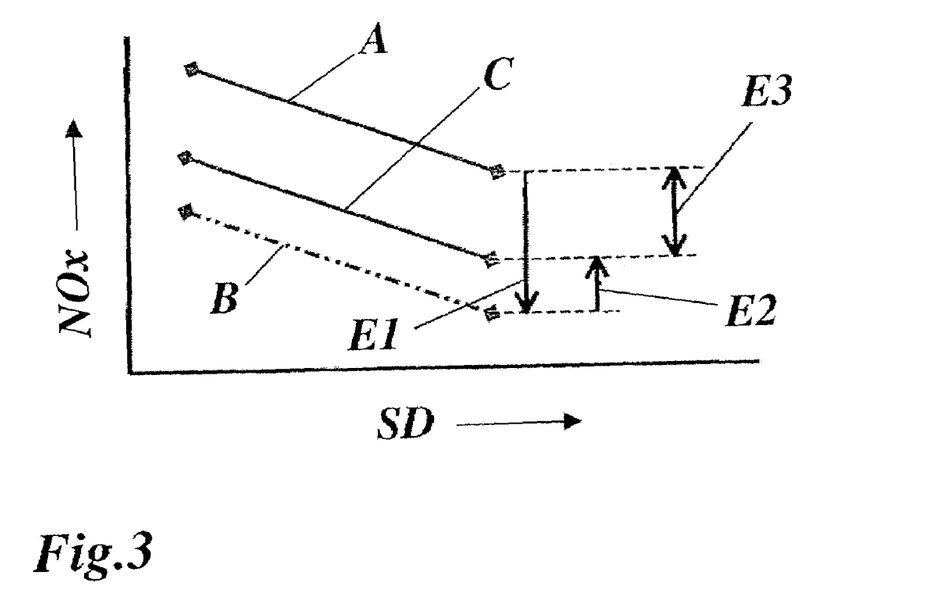
FIG. 3 shows a diagram of the NOx emissions as a function of the fuel's nitrogen dilution (ND) for a gas turbine with (curve C) and without (curve A) reheating.

In the case of IGCC units, from conception onward, these challenges can be overcome particularly well by means of a gas turbine with reheating for the following reasons:

1. The inherent advantage associated with reheating with respect to NOx can also be transferred to syngas if the combustion temperatures in both combustors are selected so as to be optimal. As FIG. 3 shows, taking the NOx curve A as a point of departure for single stage combustion, by reducing the combustion temperature in the first combustor in the case of two-stage combustion (curve B) as a function of the dilution of the syngas SD with nitrogen, a considerable reduction E1 of the NOx emission can be achieved, which is then added to the higher emission in the second stage (E2) to an overall emission in the case of two-stage combustion (curve C), which, compared to the single-stage combustion, is still reduced by the considerable difference E3.

Figure 4:
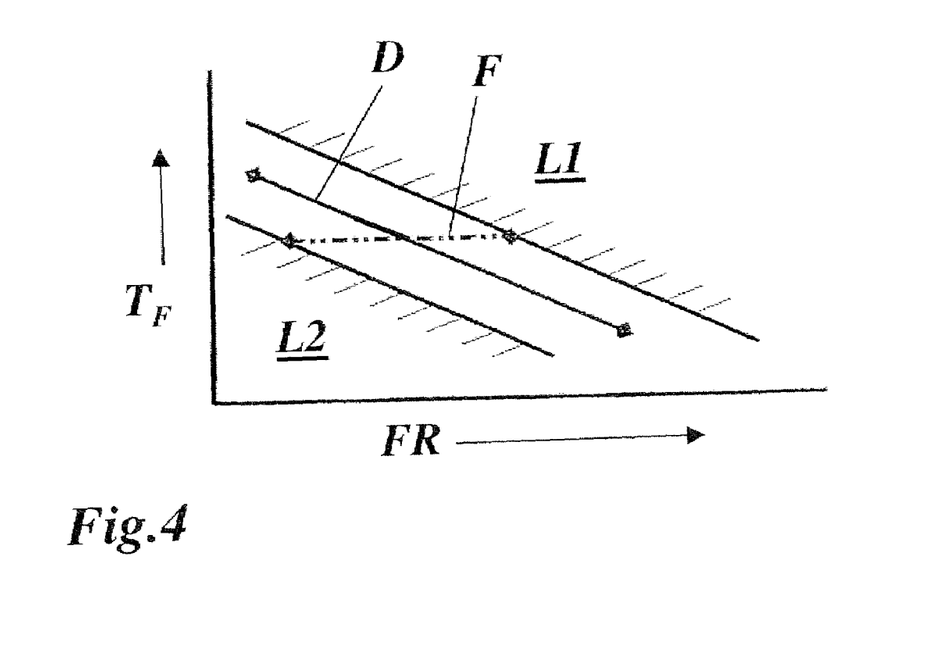
FIG. 4 shows a diagram of the admissible flame temperature range as a function of fuel reactivity (FR) for a gas turbine without (curve F) and with (curve D) reheating or sequential combustion.

2. The stability of the combustion and the flexibility in the operation of the gas turbine with re-heating are greater than in the case of a comparable gas turbine with single-stage combustion. The operational limits, according to FIG. 4, are typically set by the extinguishing of the flames (limit L2) and the flashback and/or emission levels (limit L1) as a function of fuel reactivity FR for a prescribed flame temperature ($T_F$), which leads to a permitted range of fuel qualities and fuel reactivities. In the gas turbine with single-stage combustion (curve F in FIG. 4), the limits are quickly reached on both sides. In the gas turbine with reheating (curve D in FIG. 4), this operational limit is definitely increased because two combustion systems render operation in the case of two independent flame temperatures possible, e.g. with a lower temperature in the first stage and a higher temperature in the second stage, with slight disadvantages with respect to NOx.

Figure 5:
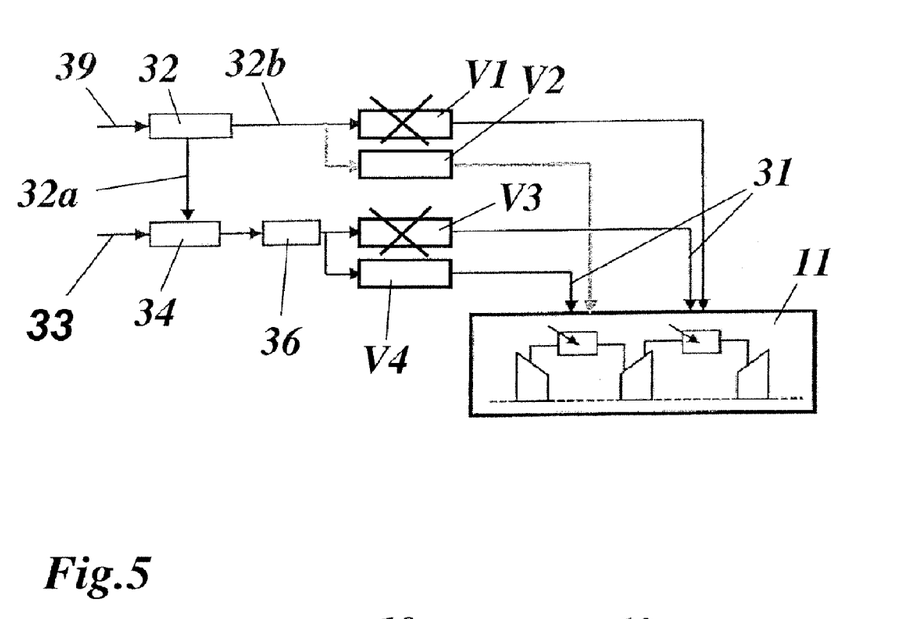
FIG. 5 shows a markedly simplified schematic of the interaction of a gas turbine with reheating with an air separation and syngas production unit, with reference to the requisite level of pressure.

3. The requirements for the gas pressure can be minimized if the greatest proportion of the diluting nitrogen ($N_2$) is injected into the second combustion system (combustor 19), which typically works with pressures between 15 and 20 bar. The optimal selection of gasification unit, air separation unit, and gas turbine depends upon the selection of the various technologies. A configuration that is distinguished by minimized gas compression and thus, minimized loss of power, is represented schematically in FIGS. 5 and 6. It employs the inherent advantages of sequential combustion. According to FIG. 5, the nitrogen in the case of the separation of the air 39 in the air separation unit 32 is led via nitrogen line 32b directly, on the one hand (without additional compression by means of a compressor V1) to the second combuster of the gas turbine 11, whereas the nitrogen that is led to the first combustor is compressed in the compressor V2. Accordingly, the syngas, which is produced from coal 33 in the coal gasifier 34 and purified in the filtering device 36, is led via the syngas line 31, on the one hand directly (without additional compression by means of a compressor V3) to the second combustor, whereas the nitrogen that was led to the first combustor is compressed in the compressor V4. Saving the two compressors V1 and V3 is symbolized by the crossed-out figures in FIG. 5.

Figure 6:
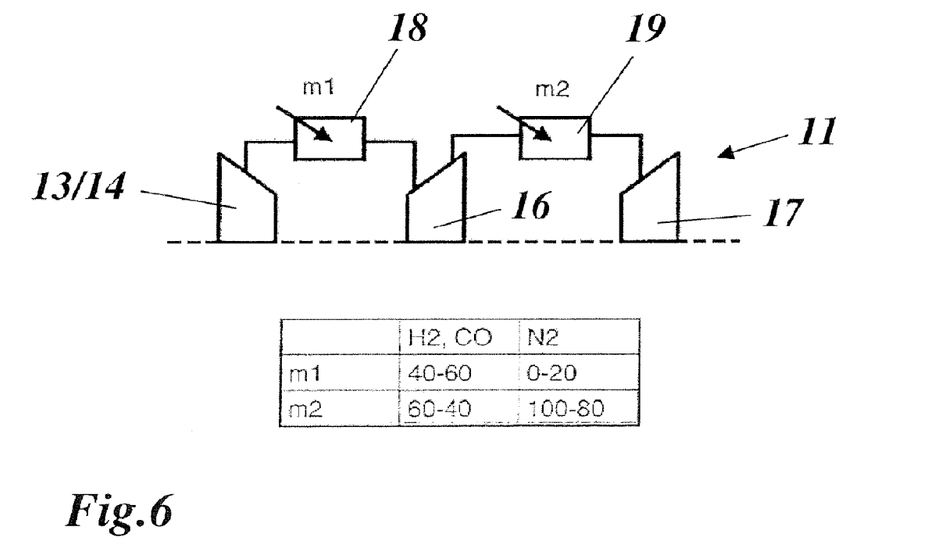
FIG. 6 shows a diagrammatic representation of the separation of the mass flows of syngas and diluted nitrogen to both combustors of the gas turbine with reheating.

An optimized operation of the unit results, according to FIG. 6, if the mass flows m1 and m2, which are led to the first combustor 18 and to the second combustor 19, have, in each case, according to the table from FIG. 6, 40-60% of the syngas and 0-20% of the nitrogen (mass flow m1) or 60-40% of the syngas and 100-80% of the nitrogen (mass flow m2). This has the additional advantage of improved stability of combustion and mixing quality in the mixer of the second stage of combustion.

Figure 7:
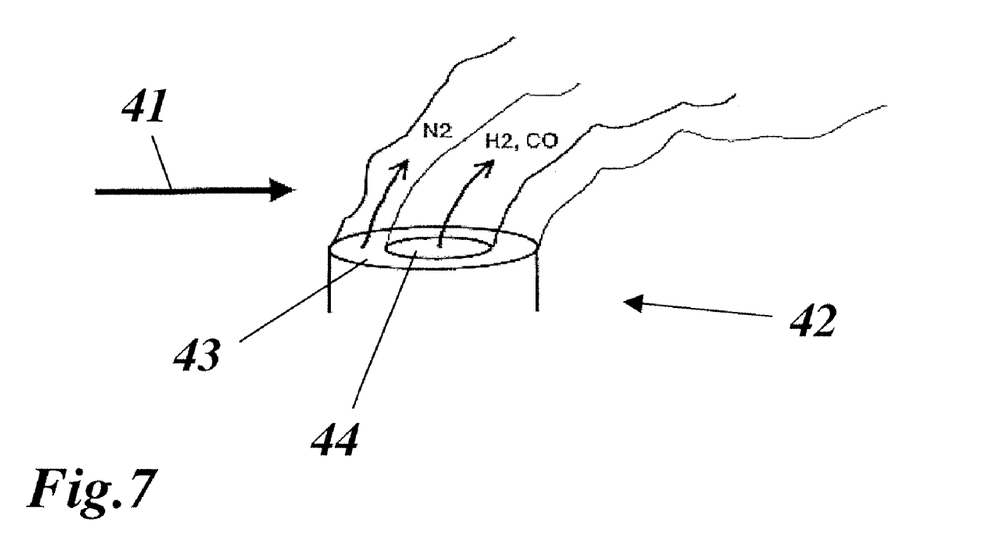
FIG. 7 shows a simplified representation of the preferred configuration for spraying in the syngas and the nitrogen within the context of the invention.

A typical nozzle configuration for spraying in the syngas ($H_2$, CO) and nitrogen ($N_2$) is shown in simplified form in FIG. 7: both gases are blown in concentrically by means of a fuel nozzle 42, such that the syngas flows in through a central nozzle 44, whereas the nitrogen is blown in through an annular nozzle 43 that concentrically surrounds the central nozzle 44. In the process, the fuel nozzle 42 is oriented perpendicular to the direction of the compressed air that flows into the combustor(s) or of the outgoing air from the first turbine. As a result of the mantle-like sheathing of the syngas jet with nitrogen, the syngas is shielded and cooled, and so the spontaneous ignition by the hot, compressed air or the outgoing air, respectively, is clearly delayed.

LIST OF REFERENCE NUMERALS 10,30 combined cycle power plant
11 gas turbine
12 generator
13 low pressure compressor
14 high pressure compressor
15 shaft (gas turbine)
16 high pressure turbine
17 low pressure turbine
18 high pressure combustor
19 reheat combustor
20 air inlet
21,22 fuel feedline
23,24 OTC cooler
25,26 cooling line
27 heat recovery steam generator
28 flue gas line
29 steam turbine (steam cycle)
31 syngas feed line
32 air separation unit
32a oxygen line
32b nitrogen line
33 coal feeding
34 coal gasifier
35 cooling device
36 filtering device
37 $CO_2$ separator
38 $CO_2$ outlet
39 air
41 compressed air
42 fuel nozzle
43 annular nozzle
44 central nozzle
A,B,C,D,F curve
E1,E2,E3 emission difference (NOx)
FR fuel reactivity
L1,L2 limit
m1,m2 mass flow
SD syngas dilution
$T_{F1}$ flame temperature (1st combustor)
V1, . . . , V4 compressor While the invention has been described in detail with reference to exemplary embodiments thereof, it will be apparent to one skilled in the art that various changes can be made, and equivalents employed, without departing from the scope of the invention.

The invention claimed is:

1. A method for operating a gas turbine, the method comprising:
   drawing in and compressing air with the gas turbine;
   conducting compressed air to a combustion chamber;
   combusting a syngas that is generated from a fossil fuel with said compressed air, to generate hot gases;
   expanding the combustion hot gases in a downstream turbine;
   separating a portion of the compressed air into oxygen and nitrogen;
   using separated oxygen in a fossil fuel gasifier to produce the syngas;
   using a portion of the compressed air to cool parts of the gas turbine that are exposed to hot gases;
   wherein said gas turbine comprises a gas turbine with reheating including two combustors and two turbines, such that in a first of said two combustors, said syngas is combusted using the compressed air and the resultant hot gases are expanded in a first of said two turbines, and such that in a second of said two combustors, said syngas is combusted using gases from said first turbine and the resultant hot gases are expanded in a second of said two turbines;
   diluting, with 80-100% of the separated nitrogen, the syngas that is combusted in the second combustor; and
   diluting the syngas that is combusted in the first combustor with the remaining portion of the separated nitrogen.

2. A method according to claim 1, further comprising:
   directly blowing the nitrogen that occurs in conjunction with the separation of the air into the second combustor.

3. A method according to claim 1, further comprising:
   compressing to a higher pressure in a compressor the nitrogen provided for the first combustor, prior to being blown into the combustor.

4. A method according to claim 1, further comprising:
   blowing into the second combustor a portion of the syngas produced in the coal gasifier without further compression.

5. A method according to claim 1, further comprising:
   compressing a portion of the syngas produced in the coal gasifier to a higher pressure in a compressor; and
   thereafter blowing said compressed portion of the syngas into the first combustor.

6. A method according to claim 1, further comprising:
   blowing into the combustors the syngas and the diluting nitrogen in a concentric arrangement, such that a nitrogen jet surrounds a syngas jet in the form of a mantle, in a direction perpendicular to the direction of inflowing compressed air, which compressed air flows into the combustors, or of outgoing air from the first turbine.

7. A method according to claim 1, wherein the gas turbine is part of a combined cycle power plant.

8. A method according to claim 1, wherein said fossil fuel comprises coal.

* * * * *